Sept. 9, 1969    R. T. TOLWORTHY    3,466,456
APPARATUS FOR CONNECTING TOGETHER TWO
MULTI-PHASE A.C. SUPPLIES
Filed June 8, 1966    4 Sheets-Sheet 1

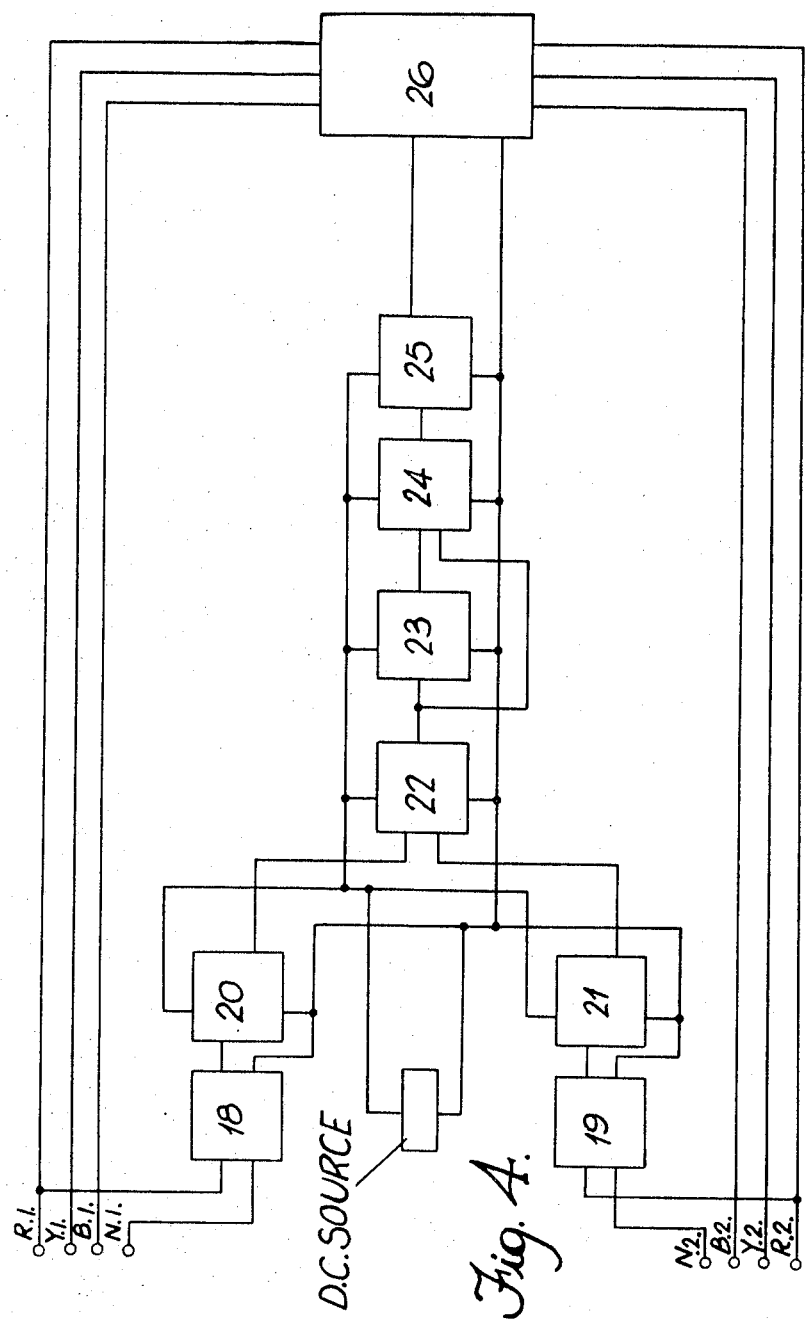

United States Patent Office 3,466,456
Patented Sept. 9, 1969

3,466,456
APPARATUS FOR CONNECTING TOGETHER TWO MULTI-PHASE A.C. SUPPLIES
Robert Theodore Tolworthy, Hemel Hempstead, England, assignor to Rotax Limited, London, England
Filed June 8, 1966, Ser. No. 556,233
Claims priority, application Great Britain, June 21, 1965, 26,081/65
Int. Cl. H02j 3/34
U.S. Cl. 307—87     2 Claims

ABSTRACT OF THE DISCLOSURE

Apparatus for connecting together two multi-phase A.C. supplies comprising a pair of signal generators for each supply for producing signals in frequency and phase relation to phases of the respectively associated supply. Transistor means responsive to said signals and serially connected to provide a signal when all are concurrently conductive indicative of the proper frequency and phase relation for interconnecting the two A.C. supplies. Switching means responsive to the transistor means signal for providing the connection of the A.C. supplies.

---

This invention relates to a method of and apparatus for use when it is required to connect together two alternating current supplies of substantially equal amplitude. When connecting together two such supplies it is essential that the phase and frequency of the two supplies should be substantially equal otherwise heavy current surges will occur at the instant of connection, and the object of this invention is to provide a method and apparatus for providing an indication of when it is safe to connect the two supplies together.

A method in accordance with the invention comprises generating two series of signals in timed relation to the two supplies respectively, combining said series of signals so that a third series of signals is produced when overlapping occurs between the signals of said two series of signals, and measuring the length of the train of said third series of signals, the length of said third series of signals serving to provide an indication of whether or not it is safe to connect the two supplies together.

Apparatus in accordance with the invention comprises in combination, a pair of generators for producing two series of signals in timed relation to the two supplies respectively, means for combining the two series of signals, said means being arranged to produce a third series of signals only when the signals of the two series of signals overlap, and measuring means for measuring the length of the train of signals of said third series, said measuring means being arranged to produce a signal, which is indicative of the fact that it is safe to connect the two supplies together, only when the length of the train of said third series attains a predetermined value.

Figure 1:
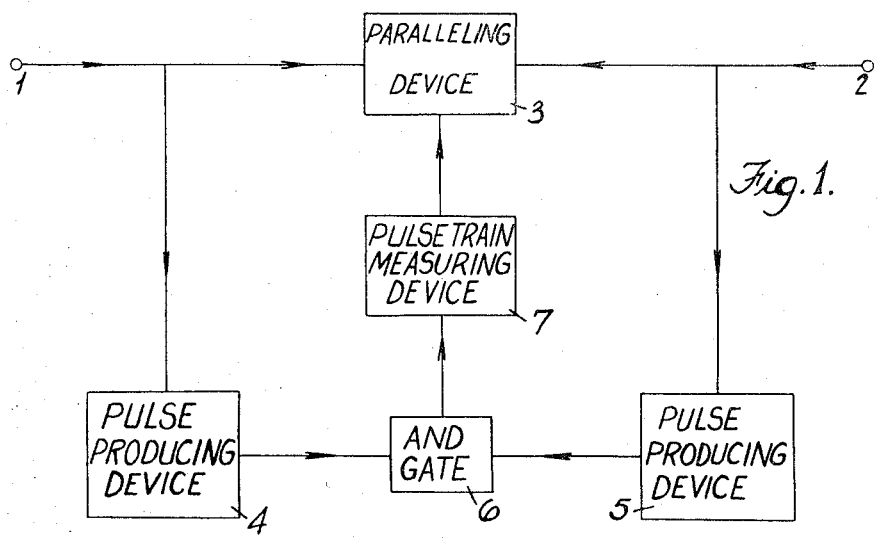
Figure 2:
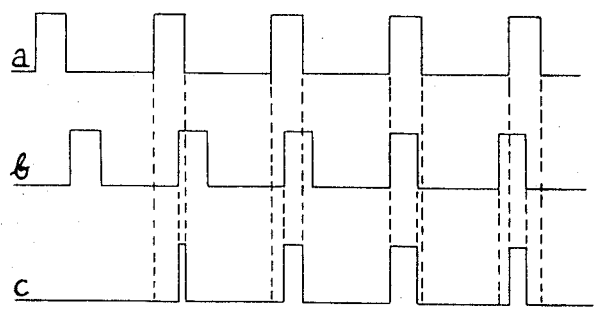
Figure 3A:
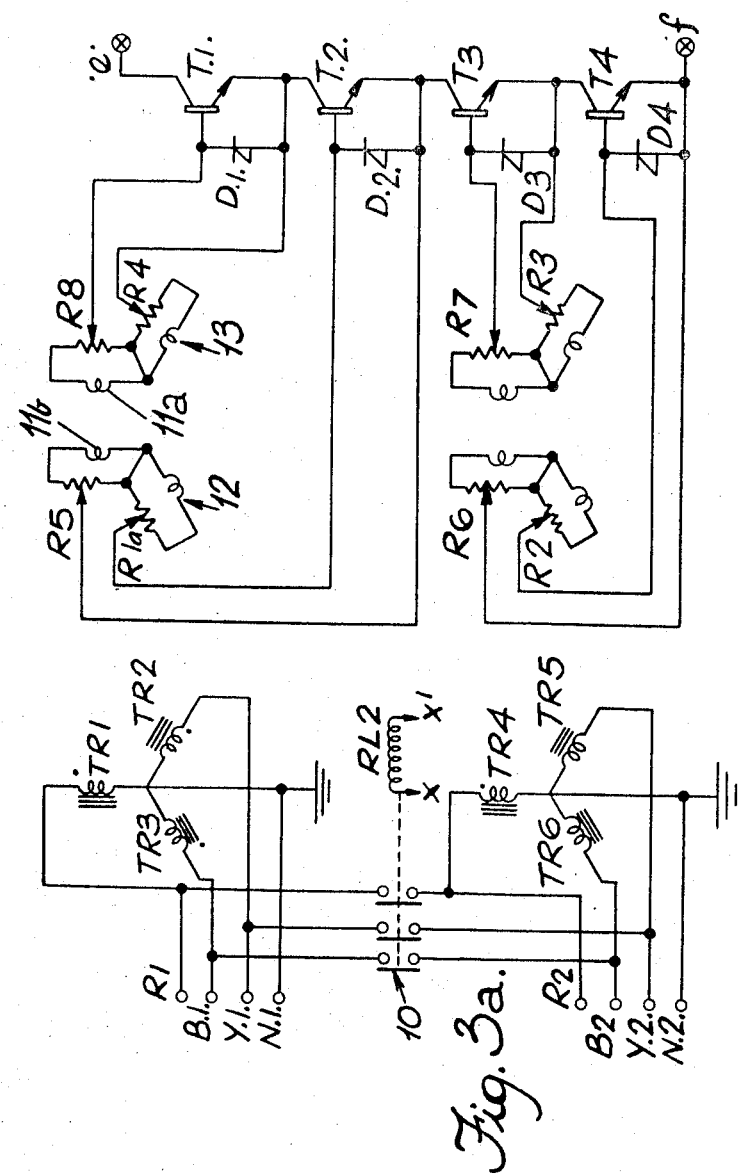

In the accompanying drawings:
FIGURE 1 is a block diagram of one example of the apparatus,
FIGURE 2 is a diagram showing the relative positions of pulses generated within the apparatus,
FIGURE 3 is divided into two parts a and b and shows the actual circuit diagram of the apparatus and
FIGURE 4 is a block diagram of a further example of an apparatus in accordance with the invention.

In FIGURE 1 there is shown terminals 1 and 2 for connection respectively to the two A.C. supplies which are to be connected together. A paralleling device 3 is provided for making the actual connection between the supplies and also provided is a pair of signal producing devices 4, 5 which are associated with the two supplies respectively. Each signal producing device produces from its associated supply a train of pulses which are of constant angular width and which occur at the same time in the cycle. As shown in FIGURE 2 device 4 produces pulses $a$ and device 5 produces pulses $b$, it being assumed for the purpose of explanation that the two supplies are of the same amplitude but slightly different in frequency. The pulse width is chosen to be equal to the maximum phase angle error which can be tolerated when connecting the two supplies together. The two trains of pulses are fed into an "and" gate 6 which, when the pulses of the two series overlap, produces a further train of pulses $c$. It will be noted that pulses in the third train only occur when the two series of pulses $a$ and $b$ overlap and when the phase angle difference between the two supplies is less than or equal to the permissible value.

Each pulse of the third series is of a different width from its neighbour when the frequency of the supplies is not equal and the maximum width of pulse occurs when exact overlap of the two series of pulses $a$ and $b$ occurs. The third series of pulses is fed to a pulse train measuring device 7 which measures the length of the train of pulses and which when the pulse train attains a predetermined length, indicative of the frequencies of the two supplies being sufficiently close, produces a signal which causes operation of the paralleling device 3.

Referring now to FIGURE 3, this is divided into two parts for convenience of presentation of the circuit diagram only. Across the phase leads $R_1B_1Y_1N_1$ of supply 1 are connected in star configuration the primary windings of transformers Tr1, 2 and 3 and across the phase leads $R_2$, $B_2$, $Y_2$, $N_2$ of supply 2 are connected in like manner the primary windings of transformers TR4, 5 and 6. The two supplies can be connected together by a contactor 10 the operation of which is effected by energisation of operating coil RL2.

Transformer TR1 is provided with two secondary windings 11$a$ and 11$b$, winding 11$a$ has connected across it resistor R8 and transformer TR2 has secondary winding 13 across which is connected resistor R4. Each resistor is tapped, the tapping from resistor R8 being connected to the base of n-p-n transistor T1 and the tapping from resistor R4 being connected to the emitter thereof. Furthermore, an end of winding 11$a$ is connected to an end of winding 13 this connection being in the same relation as the primary connections, and a diode D1 is connected between the base and emitter terminal of transistor T1 to remove the negative half cycle of the voltage appearing between the tappings. Thus the voltage applied to transistor T1 leads the voltage across the R1, N1 leads by an amount depending on the position of the tappings and these are adjusted so that in the particular example the voltage between the tappings leads by 45°.

The other secondary winding 11$b$ is bridged by resistor R5 and is connected to secondary winding 12 of TR3. This winding 12 is bridged by resistor R1$a$ and the tappings are connected to the base and emitter terminals of an n-p-n transistor T2, but in this case the connections to the transistor are reversed. The voltage between these tappings lags behind the voltage across the R1, N1, leads and by adjustment of the tappings the amount of lag is 45°. The collector emitter paths of transistors T1 and T2 are connected in series with the result that current can only flow therethrough when the conducting periods of the transistors overlap. The transistors are each turned on for half a cycle of the supply and their conducting periods overlap for a period of 90° once every cycle of the supply.

Transistors T3 and T4 are also provided and are connected with their emitter collector paths in series with the emitter collector paths of transistors T1 and T2. Transistors T3 and T4 are supplied with control voltages in like manner as transistors T1 and T2 but from supply 2 and it will be realised that current can only pass between points e and f, i.e. the collector of T1 and the emitter of T4, when all the transistors are in a conducting state, and this only occurs when the phase difference between the two supplies is less than 90°. Thus the current flow through these transistors has a waveform as indicated at C in FIGURE 2.

Figure 3B:
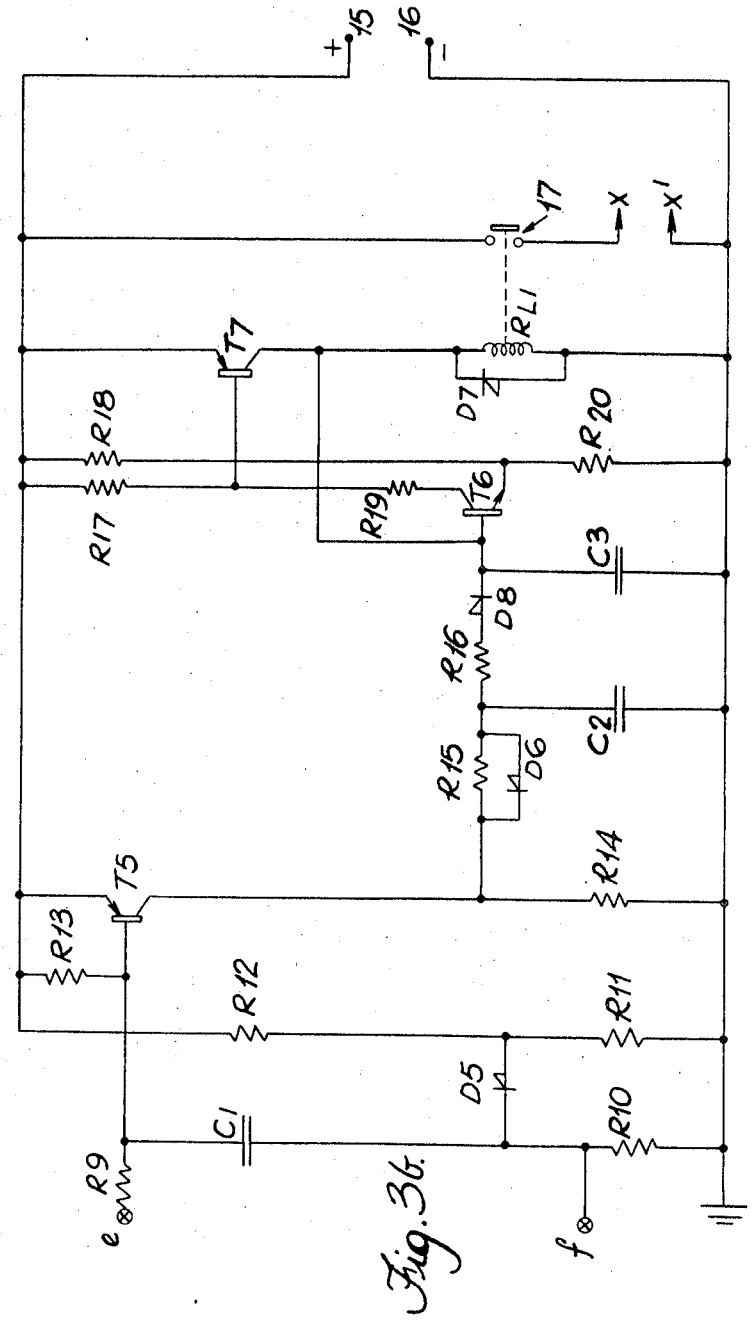

Turning now to FIGURE 3b there are provided terminals 15 and 16 for connection to a source of DC supply so as to be of positive and negative polarity respectively. Connected between terminals 15 and 16 are resistors R12 and R11 in series and a point intermediate these resistors is connected to the anode of a diode D5 the cathode of which is connected to terminal 16 through resistor R10. The anode of diode D5 is also connected to one terminal of a capacitor C1 and to the emitter of transistor T4 through point f of FIGS. 3a and 3b. The other side of the capacitor C1 is connected to terminal 15 through resistor R13 and to the collector terminal of transistor T1 through resistor R9 through point e of FIGS 3a and 3b, and also to the base of p-n-p transistor T5, the emitter of which is connected to terminal 15 and the collector of which is connected to terminal 16 through resistor R14. The collector of transistor T5 is connected through resistor R16 to the anode of diode D8 and through resistor R15 to one terminal of a capacitor C2, the other terminal of which capacitor is connected to terminal 16. Moreover, in parallel with resistor R15 is diode D6 having its cathode connected to the collector of transistor T5.

The cathode of diode D8 is connected to the base of n-p-n transistor T6 and to one terminal of capacitor C3, the other terminal of which capacitor is connected to terminal 16. The emitter of transistor T6 is connected to a point intermediate resistors R18 and R20 which are connected in series across the terminals 15, 16. The collector of transistor T6 is connected through resistors R19 and R17 in series, to terminal 15 and a point intermediate these two resistors is connected to the base of p-n-p transistor T7. The emitter of transistor T7 is connected to terminal 15 and the collector thereof to terminal 16 through relay coil RL1, the latter having a diode D7 connected in parallel therewith with its anode connected to terminal 16. Moreover, the base of transistor T6 is connected to the collector of transistor T7. Furthermore, normally open relay contacts 17 which are operated by relay coil RL1, are provided in series with contactor operating coil RL2 across the terminals 15, 16.

The operation of this part of the circuit will now be described bearing in mind that the length of the train of current pulses through transistors T1, 2, 3 and 4 is required to be measured and that when the length of this train attains a predetermined value RL2 is required to be closed to effect closure of the contactor 10.

Capacitor C1 is charged from the DC supply through resistor R10, the charging current flowing through the base emitter path of transistor T5 thereby causing the latter to be switched on. The time for which C1 charges is accurately determined by the use of the diode clamp circuit which includes diode D5 and resistor R11. This circuit is the subject of our co-pending Number 26,080/65. Thus after a predetermined time T5 will cease to conduct and this time is arranged to be slightly in excess of the time between the conduction periods of the transistors T1, 2, 3 and 4. Capacitor C1 is discharged during the conduction periods of the transistors T1, 2, 3 and 4 which results in transistor T5 conducting for an extended period of time.

When transistor T5 is conducting the potential across resistor R14 is high and capacitor C2 is charged through resistor R15, if now transistor T5 ceases to conduct capacitor C2 is discharged quickly through diode D6 and resistor R14. If, however, transistor T5 remains conducting for a sufficient length of time capacitor C2 will be charged sufficiently to cause operation of the switching circuit comprising transistors T6 and T7. T6 is normally biased off; when its base voltage is raised above a predetermined value conduction will start and the circuit will rapidly switch, leaving transistor T7 conducting and relay coil RL1 energised thereby causing closure of the contactor 10 to parallel the two supplies. Thus if transistors T1, 2, 3 and 4 are not conductive or are conductive for only a short period transistor T5 does not remain switched on for a sufficient length of time to allow capacitor C2 to charge to a sufficiently high voltage to operate the switching circuit, but if T5 remains switched on for a sufficient length of time capacitor C2 will be charged sufficiently to cause operation of the switching circuit.

Having thus described my invention what I claim as new and desire to secure by Letters Patent is:

1. Apparatus for use when connecting together two multi-phase alternating current supplies comprising four generators for producing four series of signals respectively, two of said series of signals being in time relationship and phase relationship with one of said supplies and the remaining two series being in time relationship and phase relationship with the other of said supplies, four transistors having their emitter collector paths connected in series, each of said transistors receiving respectively one of said series of signals and arranged when a signal is received to be rendered conductive, measuring means for measuring the time during which all of the transistors are concurrently in a conducting state, said measuring means producing a signal indicative of the fact that it is safe to connect the two supplies together only when all four transistors have concurrently been in a conductive state for a predetermined time, and means responsive to said measuring means signal for connecting together the two multi-phase alternating current supplies.

2. Apparatus as claimed in claim 1 in which each of said generators comprises a pair of windings across which are developed voltages in phase with two of the phase voltages of the associated supply, said windings of each generator being connected in series, a tapped resistor connected across each of said windings, the tappings of said resistors being connected to the base terminal and emitter terminal of one of the transistors and a diode rectifier connected across said tappings so that signals of one polarity only are applied to the transistor, the generators for each respective supply having one winding of each pair of windings thereof constructed and connected to develop a voltage in phase with the same one of said two phase voltages and the other winding of each pair of windings constructed and connected to provide a voltage in phase with a different phase voltage of said associated supply from that of the other winding of the other pair of windings, the tappings of said resistors being set so that the two transistors supplied with signals from the same supply each conducts for half a cycle of the supply and their conducting periods overlap for a 90° period once every cycle of the supply.

References Cited

UNITED STATES PATENTS 2,442,123   5/1948   Espley et al. _____ 307—87

ROBERT K. SCHAEFER, Primary Examiner.

H. J. HOHAUSER, Assistant Examiner